H. R. KERSTEN.
APPARATUS FOR USE IN PREPARING ANESTHETICS.
APPLICATION FILED MAR. 2, 1918.
1,362,873.
Patented Dec. 21, 1920.
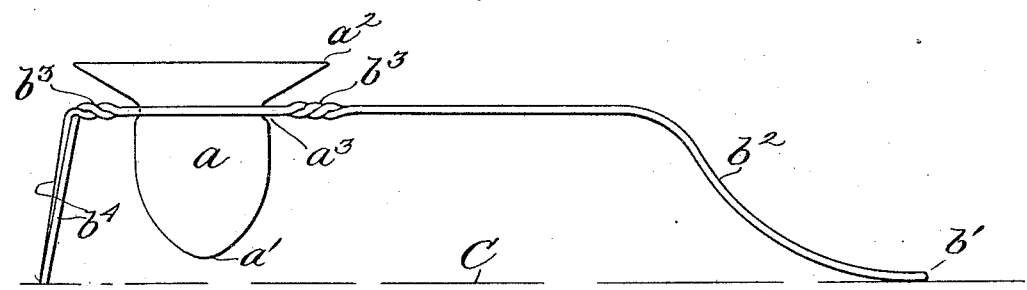
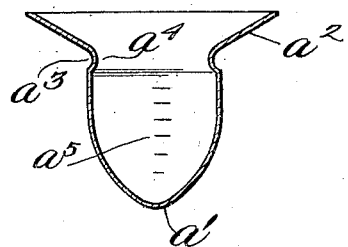
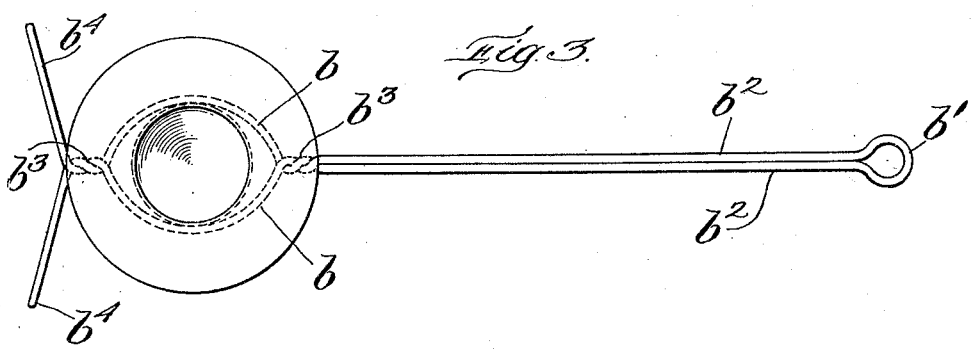
Inventor:
Herbert R. Kersten

UNITED STATES PATENT OFFICE.

HERBERT R. KERSTEN, OF BOSTON, MASSACHUSETTS.

APPARATUS FOR USE IN PREPARING ANESTHETICS.

1,362,873.  Specification of Letters Patent.  Patented Dec. 21, 1920.

Application filed March 2, 1918. Serial No. 220,100.

*To all whom it may concern:*

Be it known that I, HERBERT R. KERSTEN, a citizen of the United States, residing at Boston, in the county of Suffolk and State of Massachusetts, have invented certain new and useful Improvements in Apparatus for Use in Preparing Anesthetics, of which the following is a specification.

My invention relates to apparatus for use in preparing anesthetics and it has for its object to improve the construction thereof.

In preparing certain local anesthetics that are used in extracting teeth, the ingredients thereof are dissolved, mixed and used immediately before the operation of extracting the tooth. This dissolving and mixing process involves the use of a small dish into which the ingredients are placed and, by means of a handle that is provided for the same, the dish is held over a burner until its contents boil. The anesthetic material employed is expensive and is used in very small quantities, being withdrawn from the dish as it is used by means of a small hypodermic syringe. The boiling apparatus heretofore provided has been so constructed that it was extremely difficult if not impossible to remove from the dish all of the anesthetic by means of he syringe. That is, the last portion of the liquid could not be taken up by the syringe except with great difficulty and elaborate manipulation of the dish. Furthermore, dishes of the kind referred to have heretofore always been made of porcelain or glass and were very unsatisfactory because they were easily cracked and rendered useless, particularly when heat was applied to them to boil their contents. Also, when not in use it is customary to keep the dish submerged in alcohol, it being suspended by means of its handle in a vessel containing a quantity of the latter. The handle heretofore provided and used has been so applied to the dish that unless the apparatus was very carefully manipulated the dish would fall from the handle. If this occurred during the use of the apparatus the dish usually would be broken and its contents lost, or if it occurred while hanging the handle upon the holder to place the dish in the alcohol, the dish would fall into the vessel holding the alcohol causing annoyance and trouble and sometimes resulting in the breaking of the dish.

My invention has for its object to provide an improved apparatus of the character indicated which will be free and clear of the objectionable features above noted, and it consists of an apparatus of this kind embodying the peculiar features of construction set forth in the following description and particularly pointed out and defined in the claims at the close thereof.

In the accompanying drawings,

Figure 1 is a side elevation of my improved apparatus for use in preparing local anesthetics.

Fig. 2 is a sectional view of the dish of the apparatus shown in Fig. 1.

Fig. 3 is a plan view of the apparatus shown in Fig. 1.

My improved apparatus as herein shown consists of two parts, a dish A and a handle B. The dish A is preferably made from sheet metal spun to shape and formed with a cup-shaped body $a$ having a conical bottom $a'$ and with an outwardly flared flange $a^2$ at its top. At the junction of the flange $a^2$ and body $a$ there is provided an exterior groove $a^3$ to receive the bowed loops $b, b$ of handle B. The body $a$ is accurately made to hold a definite volume of liquid measured in cubic centimeters, when filled to the level of the bottom of the annular internal bead $a^4$ upon the interior of the dish. Also the body $a$ is interiorly marked as at $a^5$ so that accurately measured quantities less than ten cubic centimeters, the maximum capacity as measured by bead $a^4$, may be placed within the dish.

The handle B is made from a single piece of wire doubled upon itself at its middle as at $b'$. The two legs $b^2$, $b^2$, of the wire thus bent lie alongside of each other for a distance sufficient to provide a handle of the desired length, and are twisted together as at $b^3$, $b^3$, at each side of the bowed loops $b, b$, so that said loops and twists provide an elastic eye into and out of which the body $a$ can be forced. Normally, however, the spring loops $b, b$, occupy the groove $a^3$ and grip the body so that the dish cannot be accidentally disconnected from the handle either during use, or when hung in alcohol upon the holder referred to.

The ends $b^4$ of the wire are carried downwardly from the twist $b^3$ to provide two legs which, together with the handle $b'$, $b^2$, serve to hold the dish upright upon a table or other support C when the apparatus is placed upon the latter.

After placing the ingredients within the dish the latter is held over a burner until its contents is heated to the boiling point. The apparatus is then set upon the support C and its contents removed by means of the syringe as needed.

The pointed or conical bottom with which the dish is provided is an important feature of my invention as it serves to concentrate the dregs of the contents so that the last drop can be readily removed by the syringe without requiring tilting or other manipulation of the dish as has heretofore been required. Thus at all times the surgeon has both hands left free for other use.

What I claim is:

1. An apparatus of the character described comprising a handle made from wire bent to form a body-portion having an elastic dish receiving eye and supporting legs at opposite ends of said body-portion, and a cup-shaped dish made from sheet metal having a body-portion removably fitting into said eye, said body-portion being formed with an exterior indentation occupied by said eye to hold the dish against displacement.

2. An apparatus of the character described comprising a handle made from wire bent to form a body-portion having an elastic dish receiving eye and supporting legs at opposite ends of said body-portion, and a cup-shaped dish made from sheet metal having a body-portion removably fitting into and interlocked with said eye by which latter said body-portion is gripped and held.

3. A cup-shaped dish of the character described made from one piece of thin sheet metal bent so as to comprise a body-portion having a conical bottom by which the dregs of the contents are concentrated, said body-portion being formed with an annular stiffening and index corrugation which also provides a handle receiving groove upon the exterior of said body-portion, and an outwardly extending stiffening flange at the upper end of said body-portion.

4. A handle for a dish of the character described made from a single piece of wire doubled at its middle upon itself and having its two legs fastened together at separated points between which the legs are bowed outwardly to form a dish receiving eye, and having its ends shaped to form legs.

5. A handle for a dish of the character described made from a single piece of wire doubled at its middle upon itself and having its two legs fastened together at separated points between which the legs are bowed outwardly to form a dish receiving eye, and having its ends bent downwardly to provide two legs which coöperate with the handle to support the dish in upright position when placed upon a table or the like.

In testimony whereof I have affixed my signature in the presence of two witnesses.

HERBERT R. KERSTEN.

Witnesses:
 FRED. W. MCARDLE,
 ARTHUR F. RANDALL.